(12) United States Patent
Ninomiya

(10) Patent No.: US 11,174,801 B2
(45) Date of Patent: Nov. 16, 2021

(54) ENGINE AND VEHICLE HAVING THROTTLE CONTROL

(71) Applicant: SUZUKI MOTOR CORPORATION, Hamamatsu (JP)

(72) Inventor: Yoshinari Ninomiya, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 16/983,680

(22) Filed: Aug. 3, 2020

(65) Prior Publication Data
US 2021/0040903 A1 Feb. 11, 2021

(30) Foreign Application Priority Data
Aug. 6, 2019 (JP) .............................. JP2019-144351

(51) Int. Cl.
| | | |
|---|---|---|
| *F01N 3/24* | (2006.01) | |
| *F01N 13/10* | (2010.01) | |
| *F02D 9/08* | (2006.01) | |
| *F02D 9/10* | (2006.01) | |
| *F02D 41/00* | (2006.01) | |
| *F02B 75/22* | (2006.01) | |

(52) U.S. Cl.
CPC .......... *F02D 41/0002* (2013.01); *F01N 3/24* (2013.01); *F01N 13/10* (2013.01); *F01N 13/107* (2013.01); *F02D 9/08* (2013.01); *F02D 9/109* (2013.01); *F01N 2470/20* (2013.01); *F01N 2590/04* (2013.01); *F02B 75/22* (2013.01)

(58) Field of Classification Search
CPC .......... F01N 3/24; F01N 13/10; F01N 13/107; F01N 2470/20; F01N 2590/04; F02D 9/08; F02D 9/109; F02D 41/0002; F02B 75/22
See application file for complete search history.

(56) References Cited

U.S. PATENT DOCUMENTS 5,009,200 A * 4/1991 van Basshuysen .......................... F02B 27/0289
123/184.52
5,387,163 A * 2/1995 Sakamoto ............. F02B 75/007
123/443

FOREIGN PATENT DOCUMENTS

JP 2009-85112 A 4/2009

* cited by examiner

*Primary Examiner* — Audrey B. Walter
(74) *Attorney, Agent, or Firm* — Stein IP, LLC

(57) ABSTRACT

An engine includes: an engine main body including a plurality of cylinders; a plurality of exhaust pipes connected to exhaust sides of the plurality of cylinders; a plurality of throttle valves positioned on intake sides of the plurality of cylinders; a catalyst device connected to the plurality of exhaust pipes; and a controller configured to control opening and/or closing operations of the plurality of throttle valves. One of the exhaust pipes is formed shorter than other exhaust pipe. And the controller opens one of the throttle valves upstream of the one of the exhaust pipes at a higher speed or a larger opening degree than other throttle valve upstream of the other exhaust pipe when the engine is started.

12 Claims, 8 Drawing Sheets

ENGINE AND VEHICLE HAVING THROTTLE CONTROL

CROSS-REFERENCE TO RELATED APPLICATIONS

This application is based on Japanese Patent Application No. 2019-144351 filed on Aug. 6, 2019, the contents of which are incorporated herein by way of reference.

BACKGROUND

The present invention relates to an engine and a vehicle.

As an engine mounted on a vehicle such as a straddle-type vehicle, there has been known an engine in which exhaust ports are separated, such as a V-type engine and a horizontally opposed engine (see, for example, Patent Literature 1). In such an engine, a pair of front and rear cylinders are inclined in opposite directions, and an exhaust pipe extends from a front surface of the front cylinder, and an exhaust pipe extends from a rear surface of the rear cylinder. The front and rear exhaust pipes are collected and connected to a catalyst device, and when the engine is started, the catalyst device is warmed up to an active temperature by exhaust gas passing through the exhaust pipes. Then, air pollutants contained in the exhaust gas are purified by the catalyst device.

Patent Literature 1: JP-A-2009-85112

In the engine described above, the catalyst device must be installed in consideration of a layout of each of the exhaust pipes extending from the front and rear cylinders. Depending on an installation position of the catalyst device, it is necessary to lengthen the exhaust pipes extending from the front and rear cylinders, or to bend sharply the exhaust pipes in order to pass a complicated path. Therefore, when the engine is started, time required for the catalyst device to warm up is increased, and a purification performance with respect to the exhaust gas cannot be sufficiently obtained.

SUMMARY

The present invention has been made in view of the foregoing, and an object thereof is provide an engine and a vehicle that can achieve early activation of a catalyst device and improve a purification efficiency of exhaust gas.

According to one advantageous aspect of the present invention, there is provided an engine including: an engine main body including a plurality of cylinders; a plurality of exhaust pipes connected to exhaust sides of the plurality of cylinders; a plurality of throttle valves positioned on intake sides of the plurality of cylinders; a catalyst device connected to the plurality of exhaust pipes; and a controller configured to control opening and/or closing operations of the plurality of throttle valves. One of the exhaust pipes is formed shorter than other exhaust pipe. And the controller opens one of the throttle valves upstream of the one of the exhaust pipes at a higher speed or a larger opening degree than other throttle valve upstream of the other exhaust pipe when the engine is started.

DESCRIPTION OF EMBODIMENTS

In an engine according to an aspect of the present invention, a plurality of exhaust pipes are connected to exhaust sides of a plurality of cylinders, and intake amounts of the cylinders are adjusted by a plurality of throttle valves on intake sides of the plurality of cylinders, respectively. In addition, one of the exhaust pipes is formed shorter than other exhaust pipe, and the plurality of exhaust pipes are connected to a catalyst device. When the engine is started, one of the throttle valves upstream of the short exhaust pipe is opened faster or larger than other throttle valve upstream of the other exhaust pipe, and the intake amount of one of the cylinders connected to the short exhaust pipe is increased to promote combustion. Since a large amount of high-temperature exhaust gas is sent from the one of the cylinders to the catalyst device through the short exhaust pipe, the catalyst device is warmed up early by the exhaust gas to improve a purification performance. In addition, since the catalyst device is warmed up early, a degree of freedom in arrangement of the catalyst device can be improved.

EMBODIMENT

Figure 1:
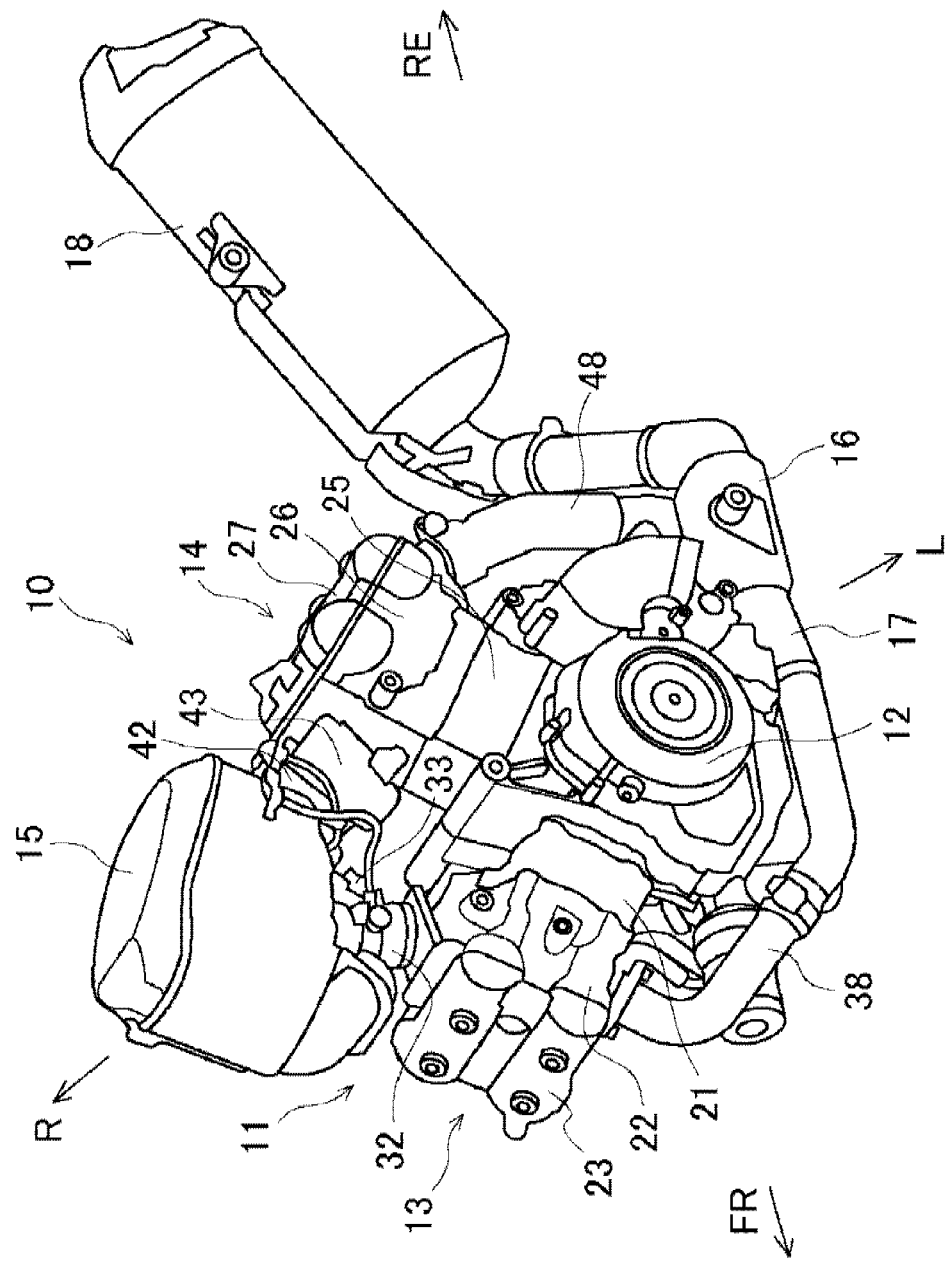
FIG. 1 is a perspective view of an engine according to a present embodiment.
Figure 2:
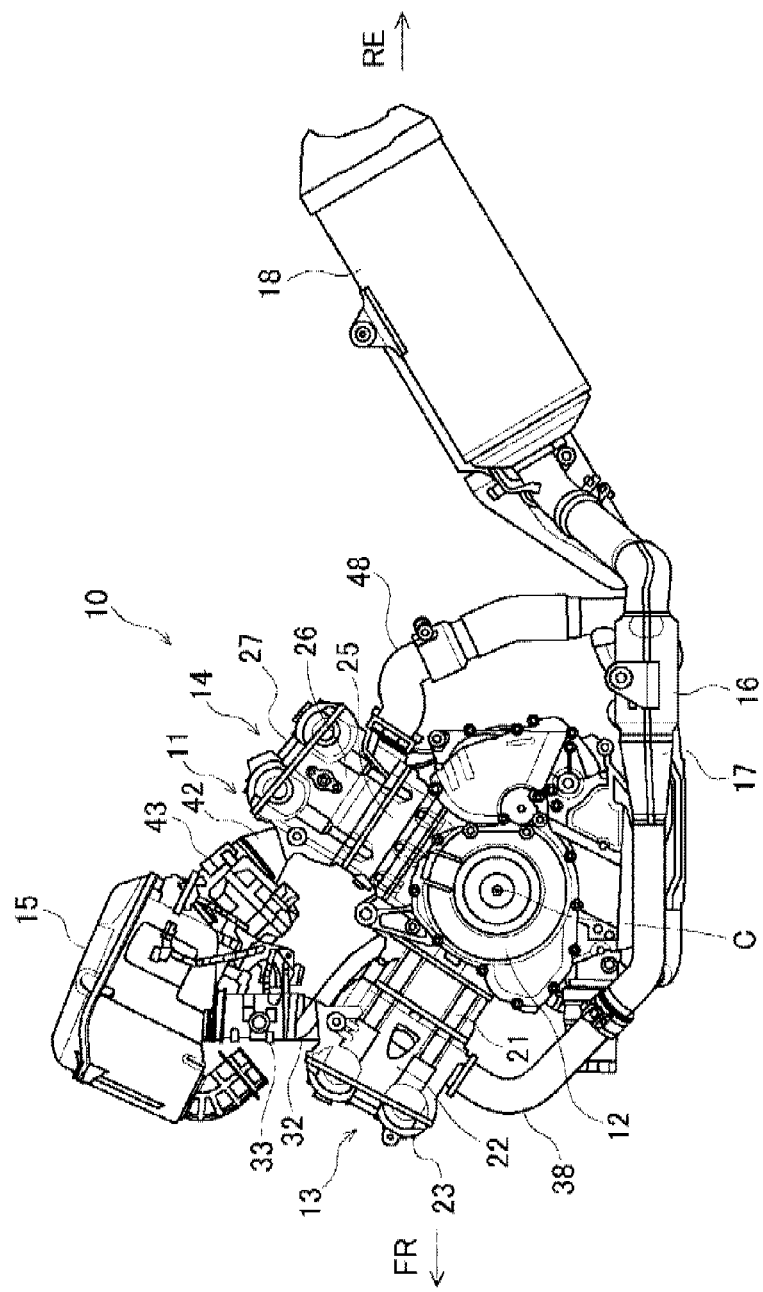
FIG. 2 is a side view of the engine according to the present embodiment.
Figure 3:
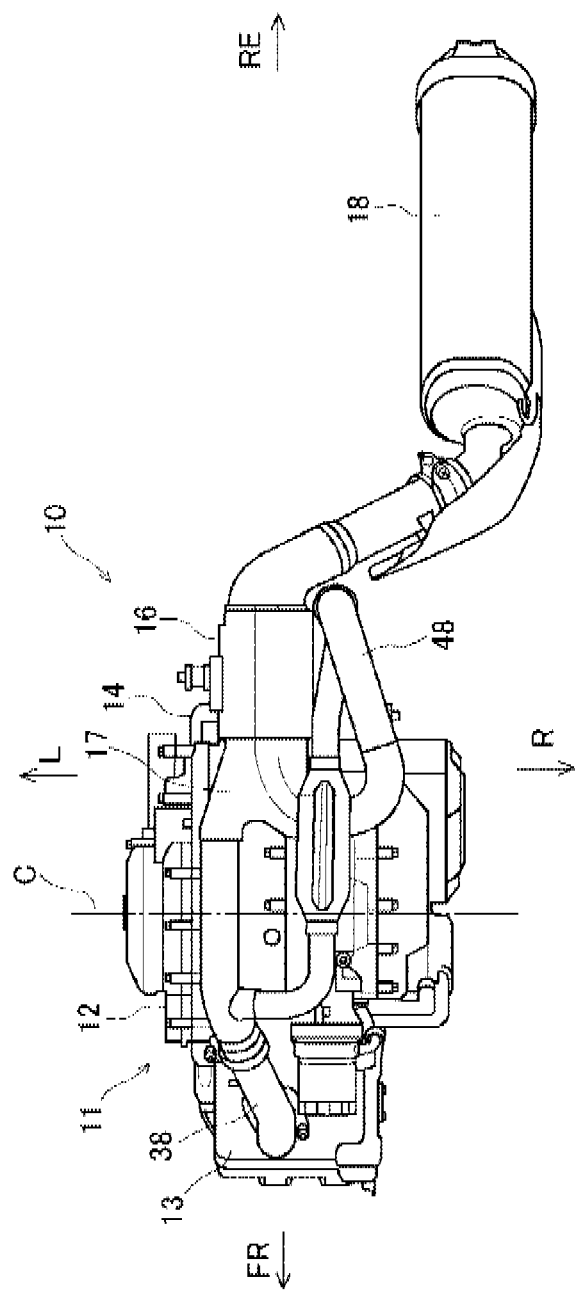
FIG. 3 is a bottom view of the engine according to the present embodiment.

Hereinafter, an embodiment will be described in detail with reference to the accompanying drawings. Here, an example in which an engine of the present embodiment is applied to a motorcycle as a straddle-type vehicle, will be described. But an application object is not limited thereto. For example, the engine may be applied to other straddle-type vehicles such as a buggy-type automatic three-wheeled vehicle. In addition, in the following drawings, a front side of a vehicle is indicated by an arrow FR, a rear side of the vehicle is indicated by an arrow RE, a left side of the vehicle is indicated by an arrow L, and a right side of the vehicle is indicated by an arrow R, respectively. FIG. 1 is a perspective view of an engine according to the present embodiment. FIG. 2 is a side view of the engine according to the present embodiment. FIG. 3 is a bottom view of the engine according to the present embodiment.

As shown in FIGS. 1 to 3, an engine 10 is a so-called V-type engine, and includes an engine main body 11 in which a front cylinder 13 and a rear cylinder 14 are arranged in a V-shape on a crankcase 12. The front cylinder 13 is inclined toward the front of the vehicle, and is formed by attaching a cylinder head 22 and a head cover 23 to a cylinder block 21 protruding from the crankcase 12. Similarly, the rear cylinder 14 is inclined toward the rear of the vehicle, and is formed by attaching a cylinder head 26 and a head cover 27 to a cylinder block 25 protruding from the crankcase 12.

An intake port 31 (see FIG. 4) is opened in a rear surface of the front cylinder 13, and a first intake pipe 32 is connected to the intake port 31. An intake port 41 (see FIG. 4) is opened in a front surface of the rear cylinder 14, and a second intake pipe 42 is connected to the intake port 41. The first and second intake pipes 32, 42 respectively extend upward from the pair of front and rear cylinders 13, 14, and are connected to a lower portion of an air cleaner 15 for filtering outside air. A first throttle body 33 for the front cylinder 13 is provided at an intermediate portion of the first intake pipe 32, and a second throttle body 43 for the rear cylinder 14 is provided at an intermediate portion of the second intake pipe 42.

Figure 4:
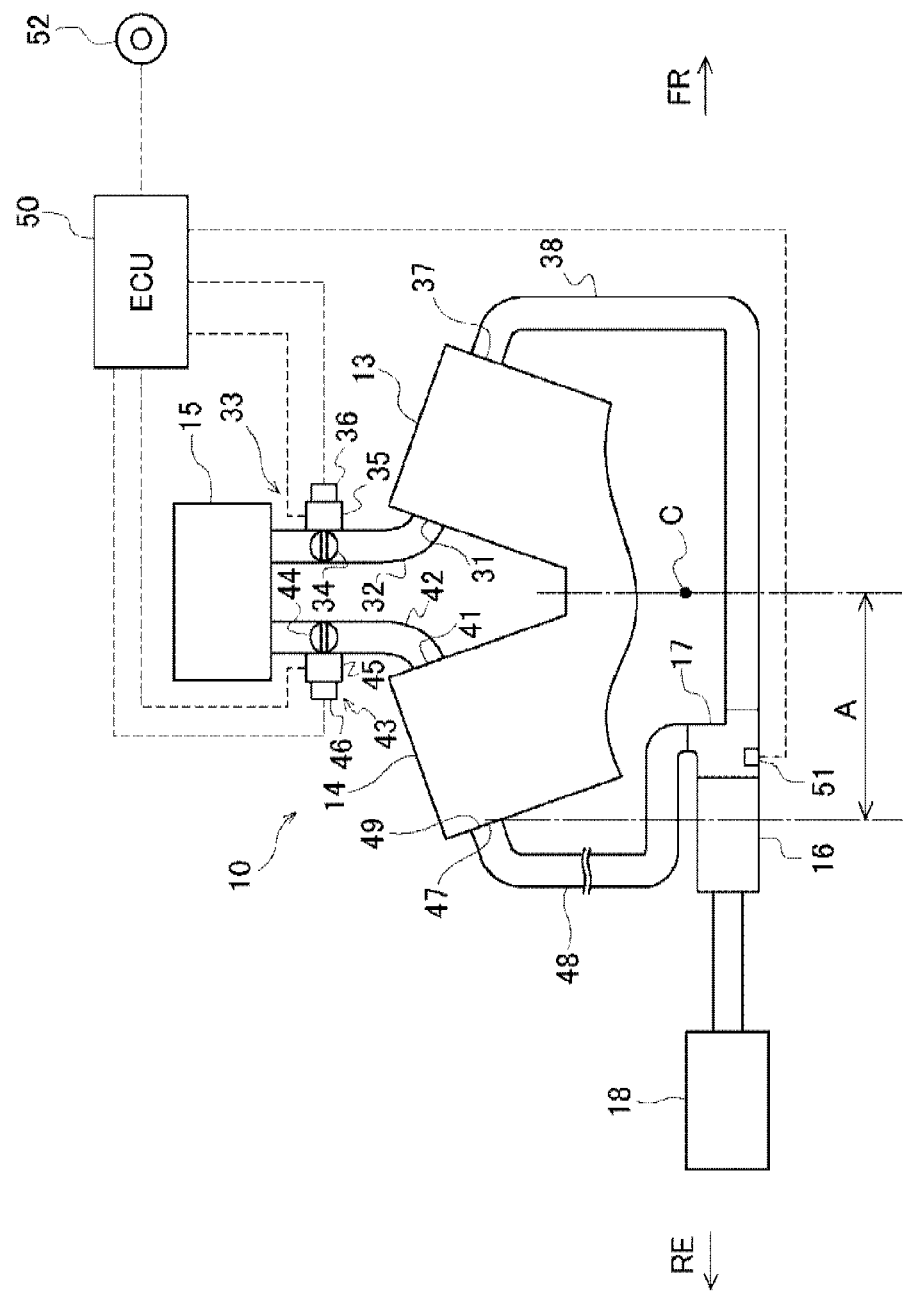
FIG. 4 is a schematic view of the engine according to the present embodiment.

The first throttle body 33 is provided with a first throttle valve 34 (see FIG. 4) for adjusting the intake amount of the front cylinder 13, and the second throttle body 43 is provided with a second throttle valve 44 for adjusting the intake amount of the rear cylinder 14 (see FIG. 4). The first and second throttle bodies 33, 43 are electronic throttle bodies, and include motors 35, 45 (see FIG. 4) that open and/or close the first and second throttle valves 34, 44, respectively. Since the first and second throttle bodies 33, 43 individually include the motors 35, 45, the first and second throttle valves 34, 44 can independently adjust the intake amounts for the respective cylinders.

An exhaust port 37 (see FIG. 4) is opened in the front surface of the front cylinder 13, and a first exhaust pipe 38 is connected to the exhaust port 37. An exhaust port 47 (see FIG. 4) is opened in the rear surface of the rear cylinder 14, and a second exhaust pipe 48 is connected to the exhaust port 47. The first and second exhaust pipes 38, 48 extend downward from the pair of front and rear cylinders 13, 14, respectively, and are connected to a catalyst device 16 that purifies air pollutants in the exhaust gas. The catalyst device 16 is installed at a rear portion of the vehicle, below the engine 10, and closer to the vehicle rear side than a center C of a crankshaft in the crankcase 12.

The second exhaust pipe 48 is connected to the catalyst device 16 below the engine 10 through a more complicated path than the first exhaust pipe 38. Therefore, pipe lengths from outlets of the exhaust ports 37, 47 to inlets of the catalyst device 16 are different between the first exhaust pipe 38 and the second exhaust pipe 48, and the pipe length of the first exhaust pipe 38 connected to the front cylinder 13 is shorter than the pipe length of the second exhaust pipe 48 connected to the rear cylinder 14. Incidentally, pipe shapes of the first and second exhaust pipes 38, 48 will be described later in detail. The first and second exhaust pipes 38, 48 are connected to the catalyst device 16 via a collecting pipe 17, and a silencer (muffler) 18 for silencing an exhaust noise is provided on a downstream side of the catalyst device 16.

In the engine 10 configured as described above, air flows from the air cleaner 15 toward the front cylinder 13 and the rear cylinder 14 via the first and second intake pipes 32, 42. The first and second throttle valves 34, 44 adjust the intake amounts to the front cylinder 13 and the rear cylinder 14, fuel is mixed with the air by a fuel supply device (not shown), and the air-fuel mixture is sent into combustion chambers of the cylinders 13, 14. The exhaust gas after combustion flows into the catalyst device 16 through the first and second exhaust pipes 38, 48 from the cylinders 13, 14, and is exhausted from the silencer 18 after the air pollutants are purified by the catalyst device 16.

Immediately after the start of the engine 10, the catalyst device 16 is at a low temperature, and the purification performance of the exhaust gas is not sufficiently obtained until the catalyst device 16 reaches an active temperature. In a case of a parallel engine used in an automatic four-wheel vehicle or the like, since the catalyst device can be installed relatively upstream of an exhaust system, the catalyst device can be warmed up early to obtain the purification performance of the exhaust gas. However, in the V-type engine used in the motorcycle or the like, since the front cylinder 13 and the rear cylinder 14 are separated in a vehicle front-rear direction as described above, the catalyst device 16 must be installed below the engine 10 or on the silencer 18 downstream of the exhaust system.

Therefore, distances from the cylinders 13, 14 to the catalyst device 16 are increased, and the catalyst device 16 cannot be warmed up early when the engine 10 starts. Therefore, in the present embodiment, the first throttle valve 34 upstream of the first exhaust pipe 38 is opened earlier than the second throttle valve 44 upstream of the second exhaust pipe 48, focusing on a fact that the pipe length of the first exhaust pipe 38 is shorter than the pipe length of the second exhaust pipe 48. Accordingly, a large amount of high-temperature exhaust gas is sent from the front cylinder 13 through the short first exhaust pipe 38 to the catalyst device 16, and the purification performance of the exhaust gas is improved by the early warm-up of the catalyst device 16.

Figure 5:
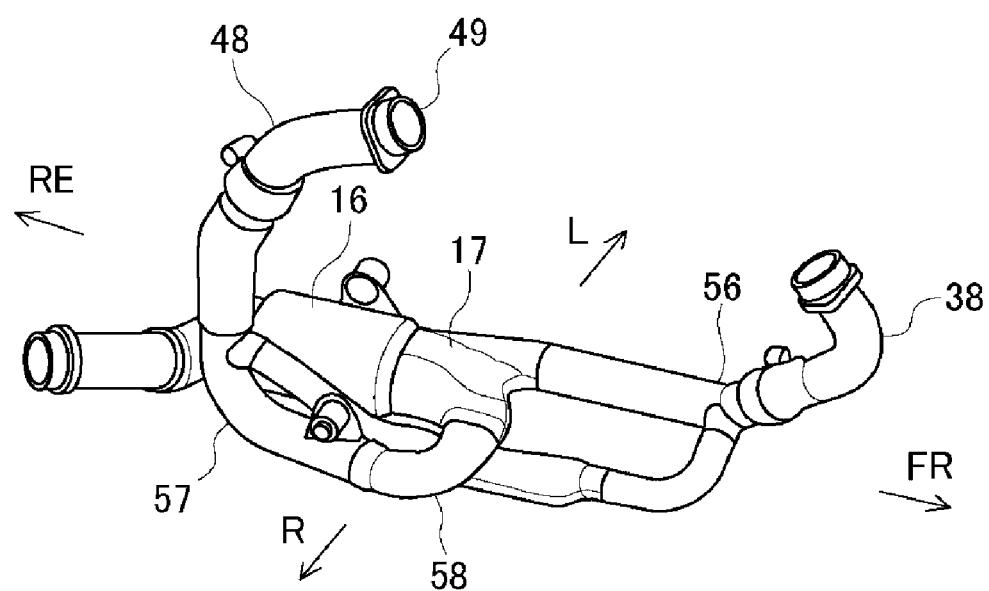
FIG. 5 is a perspective view of an exhaust device according to the present embodiment.

Hereinafter, a detailed configuration of the engine of the present embodiment will be described with reference to FIGS. 4 and 5. FIG. 4 is a schematic view of the engine according to the present embodiment. FIG. 5 is a perspective view of the exhaust device according to the present embodiment.

As shown in FIG. 4, the air cleaner 15 is connected to the intake port 31 of the front cylinder 13 via the first intake pipe 32, and the first throttle body 33 is provided in the middle of the first intake pipe 32. The first throttle body 33 is provided with the first throttle valve 34 that opens and/or closes in response to an operation of a throttle grip. The intake amount sent into the combustion chamber in the front cylinder 13 is adjusted according to an opening degree of the first throttle valve 34. In addition, the first throttle body 33 is provided with the motor 35 connected to the first throttle valve 34 and a throttle sensor 36 for detecting the opening degree of the first throttle valve 34.

Similarly, the air cleaner 15 is connected to the intake port 41 of the rear cylinder 14 via the second intake pipe 42, and the second throttle body 43 is provided in the middle of the second intake pipe 42. The second throttle body 43 is provided with the second throttle valve 44 that opens and/or closes in response to the operation of the throttle grip. The intake amount sent into the combustion chamber in the rear cylinder 14 is adjusted according to an opening degree of the second throttle valve 44. In addition, the second throttle body 43 is provided with the motor 45 connected to the second throttle valve 44 and a throttle sensor 46 for detecting the opening degree of the second throttle valve 44.

The first exhaust pipe 38 is connected to the exhaust port 37 of the front cylinder 13, and the second exhaust pipe 48 is connected to the exhaust port 47 of the rear cylinder 14. The first and second exhaust pipes 38, 48 are combined into one and connected to the catalyst device 16 by the collecting pipe 17, and the silencer 18 is connected to the downstream side of the catalyst device 16. In the catalyst device 16, the air pollutants such as carbon monoxide (CO), hydrocarbons (HC), and nitrogen oxides (NOx) contained in the exhaust gas are purified. The catalyst device 16 does not function well at a low temperature, but may malfunction and be damaged when catalyst device 16 is too hot. Therefore, an exhaust temperature sensor 51 for measuring an exhaust temperature is installed in a vicinity of the catalyst device 16.

As described above, a flow path from the first intake pipe 32 to the first exhaust pipe 38 through the front cylinder 13 and a flow path from the second intake pipe 42 to the second exhaust pipe 48 through the rear cylinder 14, are independently formed in the engine 10. The first and second exhaust pipes 38, 48 are joined at the collecting pipe 17 upstream of the catalyst device 16. But the collecting pipe 17 is positioned in a range A that is closer to the vehicle rear side than the center C of the crankshaft in the crankcase 12 and that is closer to the vehicle front side than an upstream end 49 of the second exhaust pipe 48. Therefore, the second exhaust pipe 48 extending from the rear cylinder 14 to the catalyst device 16 is bent more than the first exhaust pipe 38 extending from the front cylinder 13 to the catalyst device 16.

More specifically, as shown in FIG. 5, the first exhaust pipe 38 extends obliquely downward from the front surface of the front cylinder 13 toward the rear, and then is bent at a bent portion 56 at a gentle bending angle toward the rear of the vehicle. The second exhaust pipe 48 extends downward from the rear surface of the rear cylinder 14, and then is bent at a bent portion 57 at a sharp bending angle toward the front of the vehicle, and is further bent at a bent portion 58 at a sharp bending angle toward an inner side of the vehicle (a left side). Since the second exhaust pipe 48 passes through a more complicated path than the first exhaust pipe 38, the second exhaust pipe 48 has more sharp bendings than the first exhaust pipe 38 and has a long pipe length.

As shown in FIG. 4, the engine 10 is provided with an electrical control unit (ECU) 50 as a controller that controls opening and/or closing operations of the first and second throttle valves 34, 44. Immediately after the start of the engine 10, the motors 35, 45 of the first and second throttle bodies 33, 43 are driven by the ECU 50 until the opening degrees of the first and second throttle valves 34, 44 becomes target opening degrees. At this time, the first throttle valve 34 upstream of the first exhaust pipe 38 is opened at a higher speed than the second throttle valve 44 upstream of the second exhaust pipe 48. The intake amount of the front cylinder 13 increases, and the combustion of the front cylinder 13 is promoted more than that of the rear cylinder 14.

Therefore, an exhaust amount of the front cylinder 13 is larger than the exhaust amount of the rear cylinder 14, and more exhaust gas flows into the first exhaust pipe 38 than the second exhaust pipe 48. Since the first exhaust pipe 38 has a small number of sharp bending and the short pipe length, the exhaust temperature of the exhaust gas is less likely to decrease. A large amount of high-temperature exhaust gas is sent from the front cylinder 13 to the catalyst device 16 through the first exhaust pipe 38. Therefore, as compared with a configuration in which the first and second throttle valves 34, 44 are simultaneously opened at a low speed, the large amount of high-temperature exhaust gas can be sent to the catalyst device 16, and the catalyst device 16 can be warmed up early.

The ECU 50 has a processor and a memory mounted thereon, and the processor reads and executes a program stored in the memory, thereby performing a control process of the throttle valve to be described later. As the processor, for example, a central processing unit (CPU) or the like is used. The memory is configured by one or a plurality of storage media such as a read only memory (ROM) and a random access memory (RAM), depending on an application. In addition to the program, various parameters used for the control process are stored in the memory. In addition, an ignition switch 52 that receives a start operation of the engine 10, is connected to the ECU 50.

As speeds of the first and second throttle valves 34, 44, values obtained experimentally, empirically, or theoretically from past data or the like are used. For example, the speeds of the first and second throttle valves 34, 44 may be set based on the pipe lengths of the first and second exhaust pipes 38, 48. Further, the speeds of the first and second throttle valves 34, 44 may be varied according to a catalyst temperature of the catalyst device 16 in addition to the pipe lengths of the first and second exhaust pipes 38, 48.

Figure 6:
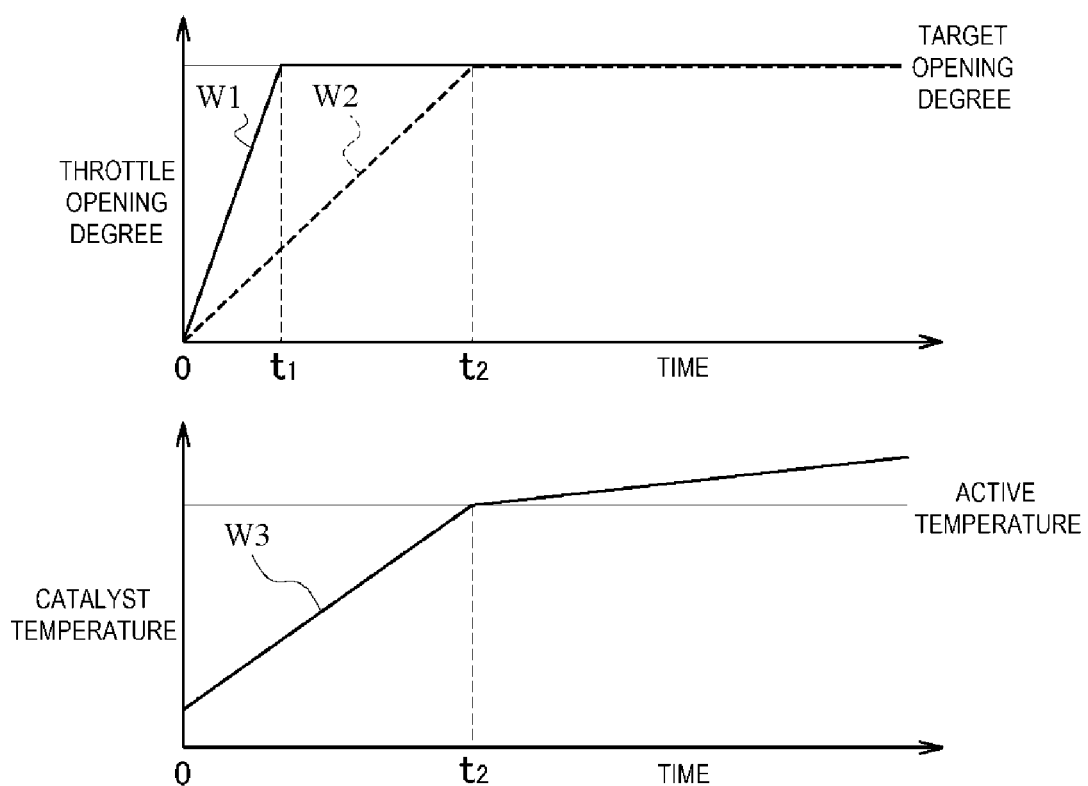
FIG. 6 is a graph showing a relationship between an opening degree of a throttle valve and a catalyst temperature according to the present embodiment.
Figure 7:
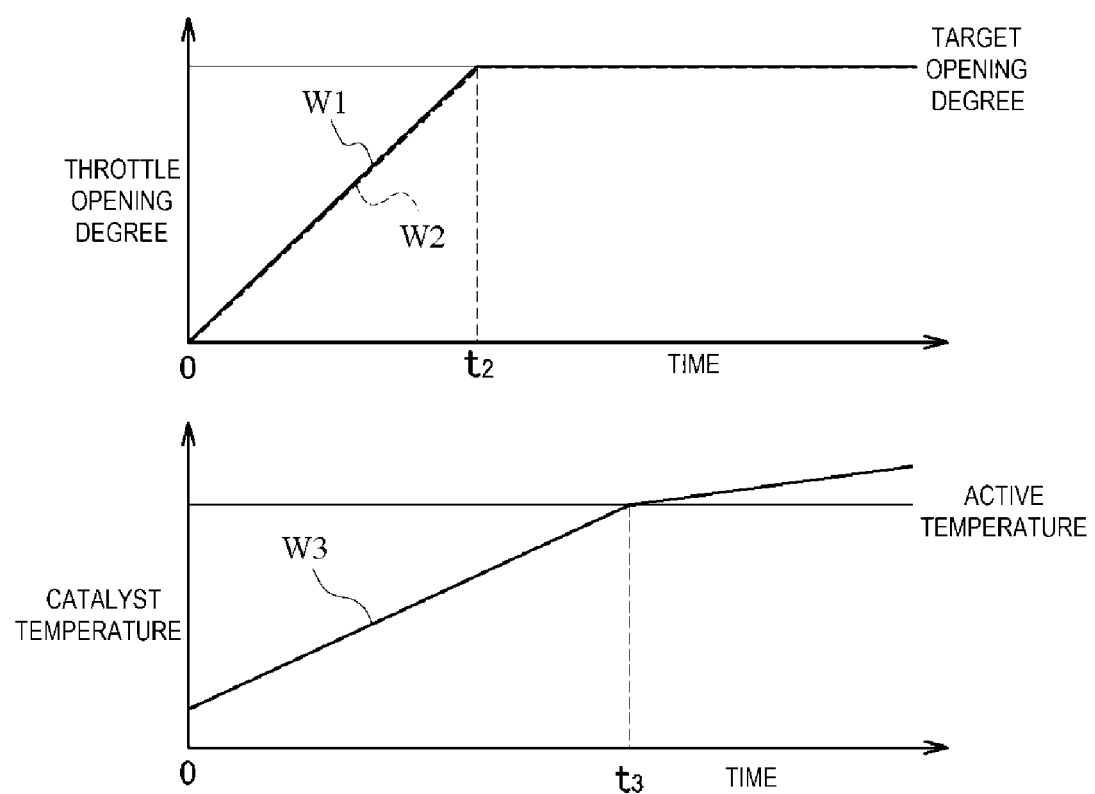
FIG. 7 is a graph showing a relationship between an opening degree of a throttle valve and a catalyst temperature according to a comparative example.

A relationship between the opening degree of the throttle valve and the catalyst temperature will be described with reference to FIGS. 6 and 7. FIG. 6 is a graph showing the relationship between the opening degree of the throttle valve and the catalyst temperature according to the present embodiment. FIG. 7 is a graph showing a relationship between an opening degree of a throttle valve and a catalyst temperature according to a comparative example. In FIGS. 6 and 7, a solid line W1 indicates the speed of the first throttle valve, a broken line W2 indicates the speed of the second throttle valve, and a solid line W3 indicates a temperature change of the catalyst device, respectively. Here, reference numerals in FIG. 4 will be used as appropriate.

In the present embodiment of FIG. 6, the first throttle valve 34 is opened at a high speed as indicated by the solid line W1, and the second throttle valve 44 is opened at a low speed as indicated by the broken line W2. After elapse of time t1 from the start of the engine 10, the first throttle valve 34 is opened to the target opening degree, and the second throttle valve 44 is opened at a low opening degree. From the time t11 to time t2, the first throttle valve 34 is maintained at the target opening degree, and the second throttle valve 44 continues to be opened toward the target opening degree. After elapse of the time t2, the second throttle valve 44 is opened to the target opening degree, and thereafter the first and second throttle valves 34, 44 are maintained at the target opening degrees.

As indicated by the solid line W3, from the start of the engine 10 to the time t2, the temperature of the catalyst device 16 rises as the opening degrees of the first and second throttle valves 34, 44 increase. In particular, since the first throttle valve 34 is opened in a short time to the target opening degree, the large amount of high-temperature exhaust gas flows from the first exhaust pipe 38 into the catalyst device 16, and the temperature of the catalyst device 16 rises in a short time. When the catalyst device 16 reaches the active temperature after the elapse of the time t2, the first and second throttle valves 34, 44 are maintained at the target opening degrees, and the temperature of the catalyst device 16 gradually rises with the time.

On the other hand, in the comparative example of FIG. 7, as indicated by the solid line W1 and the broken line W2, the first throttle valve 34 and the second throttle valve 44 are simultaneously opened at a low speed. After the elapse of the time t2 from the start of the engine 10, the first and second throttle valves 34, 44 are opened to the target opening degrees, and thereafter the first and second throttle valves 34, 44 are maintained at the target opening degrees. Since the first and second throttle valves 34, 44 are opened at the low speed, less high-temperature exhaust gas flows into the catalyst device 16 as compared with the present embodiment. Therefore, as indicated by the solid line W3, the catalyst device 16 reaches the active temperature after elapse of time t3, and time until the catalyst device 16 warms up is longer.

Figure 8:
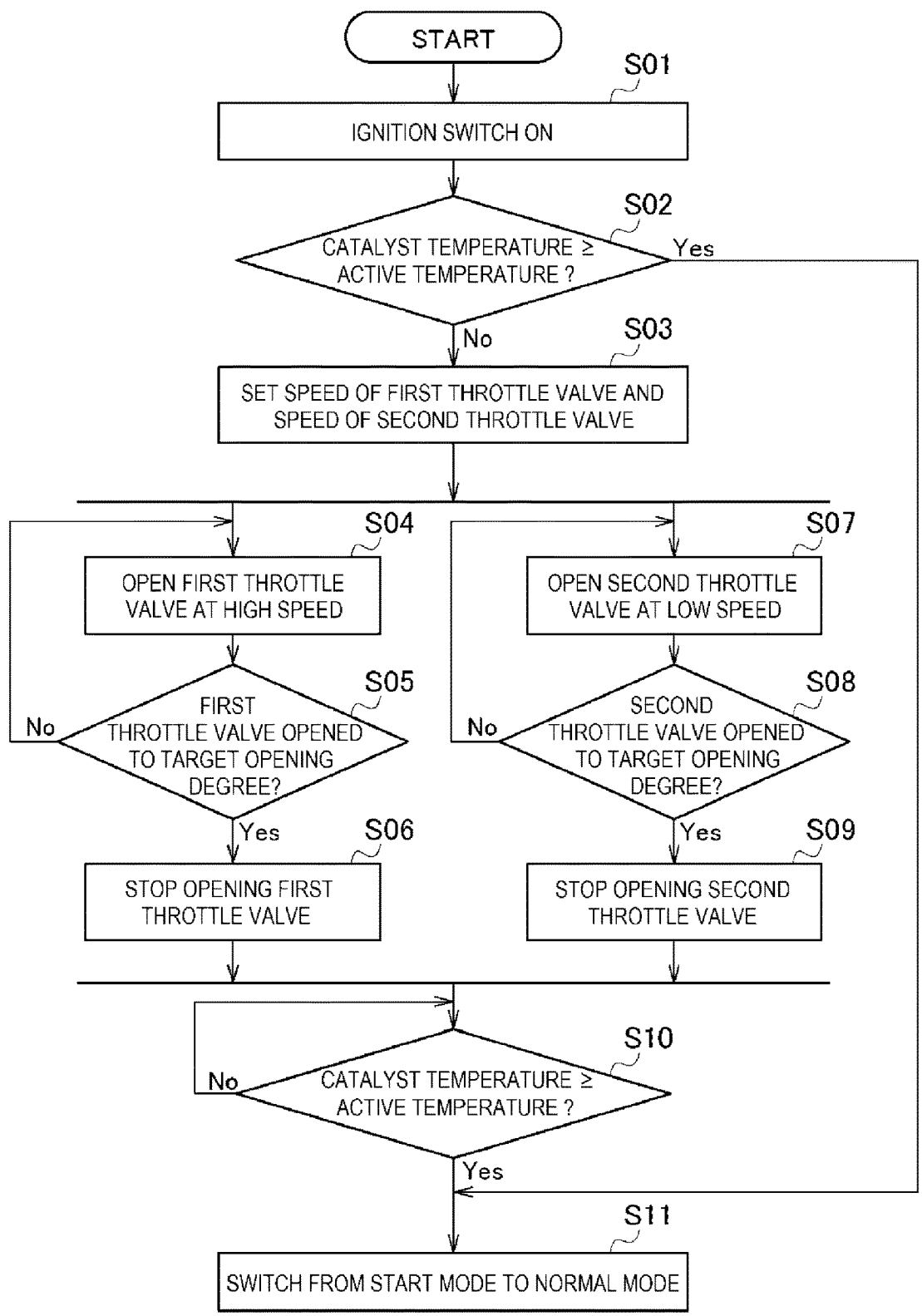
FIG. 8 is a flow chart of a valve control according to the present embodiment.

Referring to FIG. 8, the control process of the throttle valve when the engine is started, will be described. FIG. 8 is a flow chart of a valve control according to the present embodiment. Here, the reference numerals in FIG. 4 will be used as appropriate.

As shown in FIG. 8, when the ignition switch 52 is turned on (step S01), a cell motor (not shown) rotates, and the engine 10 is started. When the engine 10 is started, the ECU 50 determines whether or not the temperature of the catalyst device 16 is equal to or higher than the active temperature (step S02). The temperature of the catalyst device 16 is estimated based on a detection result of the exhaust temperature sensor 51 or the elapsed time from the start of the engine, for example. When it is determined that the temperature of the catalyst device 16 is equal to or higher than the active temperature (Yes in step S02), the ECU 50 switches an operation mode of the engine 10 from a start mode to a normal mode (step S11).

On the other hand, when it is determined that the temperature of the catalyst device 16 is lower than the active temperature (No in step S02), the ECU 50 sets the speeds of the first throttle valve 34 and the second throttle valve 44 (step S03). Since the first exhaust pipe 38 is shorter than the second exhaust pipe 48, the speed of the first throttle valve 34 upstream of the first exhaust pipe 38 is set higher than the speed of the second throttle valve 44 upstream of the second exhaust pipe 48 so that more exhaust gas flows through the first exhaust pipe 38. Next, the motors 35, 45 are simultaneously driven by the ECU 50, and a valve opening control of the first and second throttle valves 34, 44 is performed in parallel.

In the valve opening control of the first throttle valve 34, the ECU 50 opens the first throttle valve 34 at the high speed (step S04), and determines whether or not the first throttle valve 34 has been opened to the target opening degree (step S05). When the first throttle valve 34 is not opened to the target opening degree (No in step S05), the ECU 50 performs processes of steps S04, S05 until the opening degree of the first throttle valve 34 reaches the target opening degree. When the first throttle valve 34 is opened to the target opening degree (Yes in step S05), the ECU 50 stops the opening of the first throttle valve 34 (step S06).

In the valve opening control of the second throttle valve 44, the ECU 50 opens the second throttle valve 44 at the low speed (step S07), and determines whether or not the second throttle valve 44 has been opened to the target opening degree (step S08). When the second throttle valve 44 is not opened to the target opening degree (No in step S08), the ECU 50 performs processes of steps S07, S08 until the opening degree of the second throttle valve 44 reaches the target opening degree. When the second throttle valve 44 is opened to the target opening degree (Yes in step S08), the ECU 50 stops the opening of the second throttle valve 44 (step S09).

The first and second throttle valves 34, 44 are independently controlled, and the first throttle valve 34 is opened to the target opening degree before the second throttle valve 44. The exhaust gas from the front cylinder 13 toward the catalyst device 16 through the short exhaust pipe 38 increases, and the catalyst device 16 is warmed up early by the high-temperature exhaust gas. When the first and second throttle valves 34, 44 stop at the target opening degrees, the ECU 50 determines whether or not the temperature of the catalyst device 16 is equal to or higher than the active temperature (step S10). When it is determined that the temperature of the catalyst device 16 is equal to or higher than the active temperature (Yes in step S10), the ECU 50 switches the operation mode of the engine 10 from the start mode to the normal mode (step S11).

As described above, according to the present embodiment, when the engine is started, the first throttle valve 34 opens faster than the second throttle valve 44, and the intake amount of the front cylinder 13 connected to the first exhaust pipe 38 having the short pipe length is increased to promote the combustion. Therefore, since the large amount of high-temperature exhaust gas is sent from the front cylinder 13 through the first exhaust pipe 38 to the catalyst device 16, the catalyst device 16 can be warmed up early by the exhaust gas, and the purification performance with respect to the exhaust gas can be improved. In addition, since the catalyst device 16 is warmed up early, a degree of freedom in arrangement of the catalyst device 16 can be improved.

Although an example in which the control of the throttle valve according to the present embodiment is applied to a two-cylinder V-type engine has been described, the present invention is not limited to this configuration. The control of the throttle valve according to the present embodiment may be applied to an engine having three or more cylinders, or may be applied not only to the V-type engine but also to an in-line engine or a horizontally opposed engine. For example, in the engine having the three or more cylinders, a throttle valve upstream of a cylinder to which the shortest exhaust pipe is connected, is opened at a higher speed or a larger opening degree than the other throttle valves.

In the present embodiment, the first exhaust pipe connected to the front cylinder is formed shorter than the second exhaust pipe connected to the rear cylinder, but the present invention is not limited to this configuration. The second exhaust pipe may be formed shorter than the first exhaust pipe.

In the present embodiment, the front cylinder and the rear cylinder separated from each other in the vehicle front-rear direction are exemplified as the plurality of cylinders, but the present invention is not limited to this configuration. The plurality of cylinders may be formed side by side in a vehicle left-right direction without being divided into front and rear.

Although the engine of the present embodiment includes two exhaust pipes of the first exhaust pipe and the second exhaust pipe, the present invention is not limited to this configuration. The engine may include a plurality of exhaust pipes, and some exhaust pipes of the plurality of exhaust pipes may be formed shorter than other exhaust pipes. For example, two of the three or more exhaust pipes may be formed shorter than the other exhaust pipes. In this case, throttle valves upstream of the two short exhaust pipes are opened at a higher speed or a larger opening degree than throttle valves upstream of the other exhaust pipes. In addition, in a case where the engine includes three or more exhaust pipes having different lengths, the throttle valves upstream of the plurality of exhaust pipes may be opened at a high speed or a large opening degree in an ascending order of the lengths of the plurality of exhaust pipes.

In the present embodiment, a flow rate of the exhaust gas from the cylinder to the catalyst device is increased by opening the throttle valve fast, but the present invention is not limited to this configuration. By increasing the opening degree of the throttle valve, the flow rate of the exhaust gas from the cylinder to the catalyst device may also be increased.

Although the control of the throttle valve according to the present embodiment is applied to the motorcycle, the present invention is not limited to this configuration. The control of the throttle valve according to the present embodiment may be appropriately applied to other vehicles in which the throttle valve is installed, for example, a personal watercraft, a lawn mower, an outboard motor, or the like in addition to an automatic four-wheeled vehicle and a buggy-type automatic three-wheeled vehicle.

The program of the control process of the throttle valve according to the present embodiment may be stored in a storage medium. The storage medium is not particularly limited, and may be a non-transitory storage medium such as an optical disk, a magneto-optical disk, or a flash memory.

As described above, an engine (10) of the present embodiment includes: an engine main body (11) including a plurality of cylinders (the front cylinder 13, the rear cylinder 14); a plurality of exhaust pipes (the first exhaust pipe 38, the second exhaust pipe 48) connected to exhaust sides of the plurality of cylinders; a plurality of throttle valves (the first throttle valve 34, the second throttle valve 44) positioned on intake sides of the plurality of cylinders; a catalyst device (16) connected to the plurality of exhaust pipes; and a controller (ECU 50) configured to control opening and/or closing operations of the plurality of throttle valves. One of the exhaust pipes (the first exhaust pipe 38) is formed shorter than other exhaust pipe (the second exhaust pipes 48). The controller opens one of the throttle valves (first throttle valve 34) upstream of the one of the exhaust pipes at a higher speed or a larger opening degree than other throttle valve (second throttle valves 44) upstream of the other exhaust pipe when the engine is started. According to this configuration, when the engine is started, the one of the throttle valves upstream of the short exhaust pipe is opened faster or larger than the other throttle valve, and intake amount of the one of the cylinders connected to the short exhaust pipe is increased to promote combustion. Therefore, since the large amount of high-temperature exhaust gas is sent from the one of the cylinders to the catalyst device through the short exhaust pipe, the catalyst device can be warmed up early by the exhaust gas, and the purification performance with respect to the exhaust gas can be improved. In addition, since the catalyst device is warmed up early by a control of the throttle valve regardless of an arrangement position of the catalyst device, a degree of freedom in arrangement of the catalyst device can be improved.

In the engine according to the present embodiment, the controller opens the plurality of throttle valves upstream of the plurality of exhaust pipes at a high speed or a large opening degree in an ascending order of lengths of the plurality of exhaust pipes. According to this configuration, the intake amount is adjusted according to the length of the exhaust pipe by the throttle valve, so that the catalyst device can be warmed up in a shorter time, and the purification performance with respect to the exhaust gas can be further improved.

In the engine according to the present embodiment, the plurality of cylinders are a front cylinder and a rear cylinder that are separated from each other in a vehicle front-rear direction, the one of the exhaust pipes is a first exhaust pipe connected to an exhaust side of the front cylinder, the other exhaust pipe is a second exhaust pipe connected to an exhaust side of the rear cylinder, the one of the throttle valves is a first throttle valve positioned on an intake side of the front cylinder, and the other throttle valve is a second throttle valve positioned on an intake side of the rear cylinder. According to this configuration, in the engine in which the plurality of cylinders are arranged in the front-rear direction, the catalyst device can be warmed up early and the purification performance with respect to the exhaust gas can be improved.

In the engine according to the present embodiment, the engine main body includes a crankcase (12) in which a crankshaft is accommodated, the first exhaust pipe and the second exhaust pipe are joined at a collecting pipe (17) upstream of the catalyst device, and the collecting pipe is positioned closer to a vehicle rear side than a center (C) of the crankshaft and closer to a vehicle front side than an upstream end (49) of the second exhaust pipe. According to this configuration, the second exhaust pipe extending from the rear cylinder to the catalyst device has more bending than the first exhaust pipe extending from the front cylinder to the catalyst device. The fast or large opening of the first throttle valve promotes the combustion of the front cylinder. Since a large amount of exhaust gas flows smoothly into the catalyst device of a chamber in a short time from the front cylinder through the first exhaust pipe having less sharp bending, the catalyst device can be warmed up early by the exhaust gas, and the purification performance with respect to the exhaust gas can be improved.

The vehicle according to the present embodiment is equipped with the engine described above. According to this configuration, the opening and/or closing operation of the throttle valve can be controlled according to the length of the exhaust pipe, and the purification performance with respect to the exhaust gas of the vehicle can be improved.

Although the present embodiment has been described, as another embodiment, the above embodiment and the modification may be wholly or partially combined.

The technique of the present invention is not limited to the above embodiment, and various changes, substitutions, and modifications may be made without departing from the spirit of the technical idea. Further, the present invention may be implemented by using other methods as long as the technical idea can be realized by the methods through progress of the technique or other derivative technology. Accordingly, the claims cover all embodiments that may be included within the scope of the technical ideas.

What is claimed is:

1. An engine comprising:
   an engine main body including a plurality of cylinders;
   a plurality of exhaust pipes connected to exhaust sides of the plurality of cylinders;
   a plurality of throttle valves positioned on intake sides of the plurality of cylinders;
   a catalyst device connected to the plurality of exhaust pipes; and
   a controller configured to control opening and/or closing operations of the plurality of throttle valves,
   wherein one of the exhaust pipes is formed shorter than an other exhaust pipe, and
   wherein the controller opens one of the throttle valves upstream of the one of the exhaust pipes at a higher speed or a larger opening degree than an other throttle valve upstream of the other exhaust pipe when the engine is started.

2. The engine according to claim 1,
   wherein the plurality of cylinders are a front cylinder and a rear cylinder that are separated from each other in a vehicle front-rear direction,
   wherein the one of the exhaust pipes is a first exhaust pipe connected to an exhaust side of the front cylinder,
   wherein the other exhaust pipe is a second exhaust pipe connected to an exhaust side of the rear cylinder, wherein the one of the throttle valves is a first throttle valve positioned on an intake side of the front cylinder, and wherein the other throttle valve is a second throttle valve positioned on an intake side of the rear cylinder.

3. The engine according to claim 2, wherein the engine main body includes a crankcase in which a crankshaft is accommodated, and wherein the first exhaust pipe and the second exhaust pipe are joined at a collecting pipe upstream of the catalyst device, and the collecting pipe is positioned closer to a vehicle rear side than a center of the crankshaft and closer to a vehicle front side than an upstream end of the second exhaust pipe.

4. The engine according to claim 1, wherein the controller opens the plurality of throttle valves upstream of the plurality of exhaust pipes at a high speed or a large opening degree in an ascending order of lengths of the plurality of exhaust pipes.

5. The engine according to claim 4, wherein the plurality of cylinders are a front cylinder and a rear cylinder that are separated from each other in a vehicle front-rear direction, wherein the one of the exhaust pipes is a first exhaust pipe connected to an exhaust side of the front cylinder, wherein the other exhaust pipe is a second exhaust pipe connected to an exhaust side of the rear cylinder, wherein the one of the throttle valves is a first throttle valve positioned on an intake side of the front cylinder, and wherein the other throttle valve is a second throttle valve positioned on an intake side of the rear cylinder.

6. The engine according to claim 5, wherein the engine main body includes a crankcase in which a crankshaft is accommodated, and wherein the first exhaust pipe and the second exhaust pipe are joined at a collecting pipe upstream of the catalyst device, and the collecting pipe is positioned closer to a vehicle rear side than a center of the crankshaft and closer to a vehicle front side than an upstream end of the second exhaust pipe.

7. A vehicle equipped with the engine according to claim 1.

8. A vehicle equipped with the engine according to claim 2.

9. A vehicle equipped with the engine according to claim 3.

10. A vehicle equipped with the engine according to claim 4.

11. A vehicle equipped with the engine according to claim 5.

12. A vehicle equipped with the engine according to claim 6.

* * * * *